United States Patent [19]

Fujioka

[11] Patent Number: 4,972,281
[45] Date of Patent: Nov. 20, 1990

[54] MAGNETIC HEAD SUPPORTING DEVICE FOR FLEXIBLE RECORDING MEDIUM

[75] Inventor: Masahiko Fujioka, Fuji, Japan

[73] Assignee: Kabushiki Kaisha Toshiba, Kawasaki, Japan

[21] Appl. No.: 507,018

[22] Filed: Apr. 11, 1990

Related U.S. Application Data

[63] Continuation of Ser. No. 342,721, Apr. 25, 1989, abandoned, which is a continuation of Ser. No. 32,443, Mar. 31, 1987, abandoned.

[30] Foreign Application Priority Data

Mar. 31, 1986 [JP] Japan .................. 61-72928

[51] Int. Cl.⁵ .................. G11B 5/48; G11B 21/22
[52] U.S. Cl. .................. 360/105; 360/109; 360/99.01
[58] Field of Search .................. 360/104–105, 360/103, 97.01, 99.01, 130.33, 109

[56] References Cited

U.S. PATENT DOCUMENTS

| | | | |
|---|---|---|---|
| 4,089,029 | 5/1978 | Castrodale et al. | 360/99 |
| 4,151,573 | 4/1979 | Tandon et al. | 360/104 |
| 4,167,766 | 9/1979 | Chau | 360/104 |
| 4,218,714 | 8/1980 | Isozaki et al. | 360/99 |
| 4,291,350 | 9/1981 | King et al. | 360/104 |
| 4,306,258 | 12/1981 | Higashiyama et al. | 360/99 |
| 4,328,521 | 5/1982 | Pexton et al. | 360/104 |
| 4,343,025 | 8/1982 | Kronfeld et al. | 360/104 |
| 4,400,749 | 8/1983 | Franke et al. | 360/104 |
| 4,661,872 | 4/1987 | Saito | 360/104 |
| 4,703,375 | 10/1987 | Chan et al. | 360/105 |

FOREIGN PATENT DOCUMENTS

| | | | |
|---|---|---|---|
| 58-218070 | 12/1983 | Japan | 360/105 |
| 58-218071 | 12/1983 | Japan | 360/105 |
| 60-76052 | 4/1985 | Japan | 360/105 |
| 60-167159 | 8/1985 | Japan | 360/105 |
| 61-73288 | 4/1986 | Japan | 360/104 |
| 2178219 | 2/1987 | United Kingdom | 360/105 |

Primary Examiner—John H. Wolff
Attorney, Agent, or Firm—Cushman, Darby & Cushman

[57] ABSTRACT

A magnetic head supporting device includes a carriage and a head arm mounted on the carriage to be movable between a loaded position and an unloaded position. Magnetic heads are mounted on the carriage and head arm by means of gimbal springs, and face each other. Each magnetic head is urged toward a recording medium located between the heads by means of a leaf spring. When the head arm is moved to the loaded position, the heads hold the medium from both sides thereof and the gimbal springs are kept substantially undeformed by the leaf springs. When the head arm is moved to the unloaded position, the magnetic heads are prevented from moving toward the medium by stoppers provided at the carriage and head arm, respectively.

6 Claims, 4 Drawing Sheets

MAGNETIC HEAD SUPPORTING DEVICE FOR FLEXIBLE RECORDING MEDIUM

This is a continuation of Application Ser. No. 07/342,721, filed Apr. 25, 1989, which is a continuation of Application Ser. No. 07/032,443 filed Mar. 31, 1987, which was abandoned upon the filing hereof.

BACKGROUND OF THE INVENTION

The present invention relates to a magnetic head supporting device for supporting a head which is used to record on or reproduce information from both sides of a flexible recording medium, such as a floppy disk.

In general, magnetic head supporting devices comprise a pair of head arms extending parallel to each other, and a pair of magnetic heads mounted individually on the distal end portions of the arms and facing each other. In read/write operation, a recording medium is held between the magnetic heads from both sides. For an accurate operation, the magnetic heads must be securely in contact with the medium. To attain this, the heads are pressed against the recording medium with a predetermined load.

Conventionally known are supporting devices which use gimbal springs or a combination of gimbal springs and leaf springs, as means for applying the predetermined load to the magnetic heads.

In a supporting device of the former type, a gimbal spring is attached to each of the head arms, and a magnetic head is fixed in the center of each gimbal spring. In operation, when the magnetic heads hold a recording medium between them, the gimbal springs are deformed or distorted so as to move away from the medium. An urging force, produced in the gimbal springs by such deformation, is applied as a load, to the magnetic heads. The gimbal springs, which allow the magnetic heads to move around both the x- and y-axes, serve to absorb dimensional errors of the device and distortion of the recording medium.

In the supporting device constructed in this manner, the gimbal springs apply the predetermined load to the magnetic heads by being deformed. In order to stand such deformation and to produce the load, the springs must have a relatively large spring force and high rigidity. If the gimbal springs have a larger spring force and higher rigidity, however, the degree of freedom of their deformation lowers in proportion. Moreover, the degree of freedom is less in a deformed state than in an undeformed or neutral state. Thus, in the arrangement described above, the degree of freedom of the deformation of the gimbal springs, or of the movement of the magnetic heads, is so low that it is often unable to compensate for irregularities in the recording medium and dimensional errors of the supporting device.

In a supporting device of the latter type, on the other hand, a magnetic head is fixed to a gimbal spring, which cantilevers from the distal end of each of a pair of head arms. Likewise, a leaf spring cantilevers from the distal end of the head arm, and a pivot pin, which is fixed to the free end of the leaf spring, is in contact with the gimbal spring. Thus, the gimbal spring and the magnetic head are urged toward the recording medium by the leaf spring.

According to the supporting device constructed in this manner, a load is applied to the magnetic head by means of the leaf spring, so that the gimbal spring need not be deformed. In such an arrangement, the gimbal spring can fully perform its functions. However, this conventional device is subject to the following drawback. In general, when the device is in an unloaded state, the head arms are moved away from each other in order to separate the magnetic heads from the recording medium. In this supporting device, however, the gimbal springs, which are urged toward the recording medium by the leaf springs, bend toward the medium as the head arms move. In order to separate the magnetic heads securely from the recording medium, therefore, the head arms must be moved a significant distance. Thus, the supporting device of this type requires a wide mounting space when it is set in a disk drive device or the like.

SUMMARY OF THE INVENTION

The present invention has been contrived in consideration of these circumstances, and it is an object of the invention to provide a magnetic head supporting device which can make the most of the characteristics of gimbal springs without requiring a long transfer distance of head arms.

In order to achieve the above object, a magnetic head supporting device according to the present invention comprises a carriage; first and second head arms supported by the carriage; a gimbal spring fixed to the first head arm; first and second magnetic heads fixed to the gimbal spring and the second head arm, respectively, and facing each other, at least one of the head arms being movable between a loaded position where the first and second magnetic heads hold an information recording medium from both sides thereof, and that the gimbal spring is not practically deformed, and an unloaded position where the magnetic heads are separated from the recording medium; head load applying means attached to the first head arm, for urging the first magnetic head toward the information recording medium through the gimbal spring, so that the first magnetic head is subjected to a predetermined head load, and the gimbal spring practically remains undeformed when the movable head arm is moved to the loaded position; and regulating means attached to the first head arm, for regulating the displacement of the first magnetic head toward the information recording medium when the movable head arm is moved to the unloaded position.

BRIEF DESCRIPTION OF THE DRAWINGS

FIGS. 1 to 5 show a magnetic head supporting device according to a first embodiment of the present invention, in which FIG. 1 is a perspective view of the device, FIG. 2 is a side view of the device in a loaded state;

FIG. 3 is an enlarged sectional view showing a principal part of the device in an unloaded state;

FIG. 4 is an enlarged sectional view showing the principal part of the device in the loaded state; and FIG. 5 is a diagram illustrating the relationship between the displacement of a pivot pin and the change of head load;

FIGS. 6 and 7 show a magnetic head supporting device according to a second embodiment of the invention, in which FIG. 6 is an enlarged sectional view showing a principal part of the device in the unloaded state, and FIG. 7 is an enlarged sectional view showing the principal part of the device in the loaded state.

DETAILED DESCRIPTION OF THE PREFERRED EMBODIMENTS

Preferred embodiments of the present invention will now be described in detail with reference to the accompanying drawings.

Figure 1:
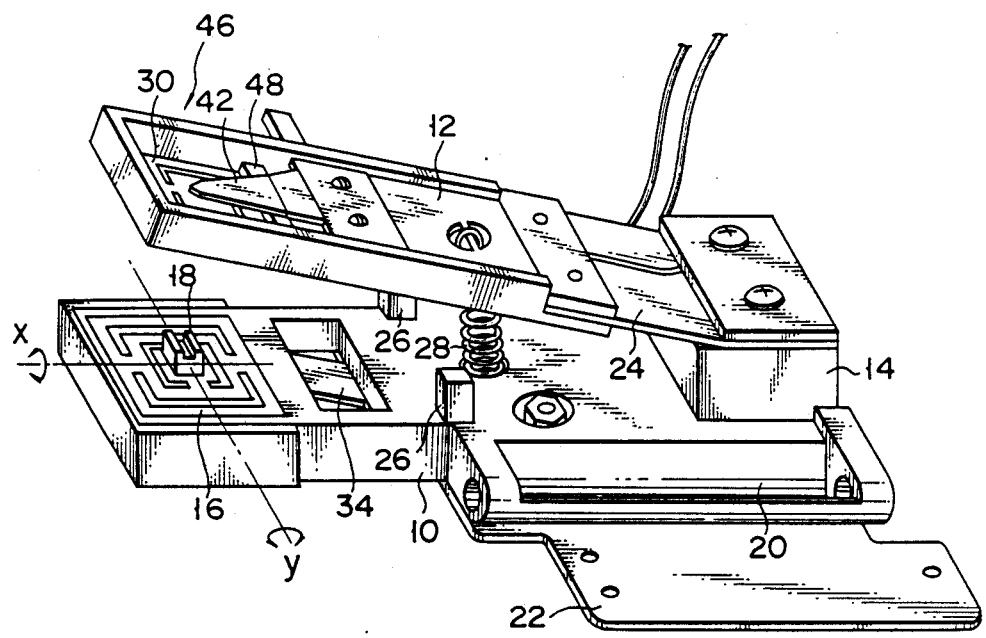
Figure 2:
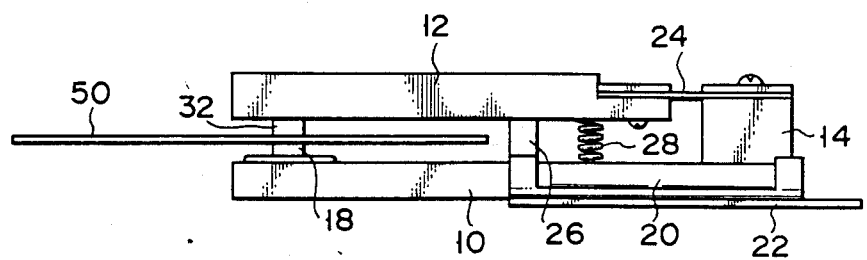

As shown in FIGS. 1 and 2, a magnetic head supporting device comprises elongate carriage 10 and elongate head arm 12, facing each other.

Supporting block 14 is formed on the upper surface of the proximal end portion of carriage 10, while rectangular gimbal spring 16 is fixed to the upper surface of the distal end portion of the carriage. Magnetic head 18 is fixed in the center of spring 16, so that it is pivotable around the x- and y-axes. Since magnetic head 18 is disposed on the lower side (side O, SO) of floppy disk 50, magnetic head 18 is hereinafter referred to as SO-head. Thus, an extension of carriage 10 serves also as a head arm for supporting the magnetic head. Extending in the longitudinal direction of carriage 10, guide hole 20 is formed in one side portion of the carriage. A guide rail (not shown) is adapted to be passed through hole 20. Thus, carriage 10 can move in a straight line along the guide rail. Also, carriage 10 has a pair of stoppers 26 which protrude upward therefrom. Base plate 22 is fixed to the lower surface of carriage 10 and projects outward therefrom. Mounted on plate 22 is a conversion mechanism which serves to convert the rotational force of a drive source, such as a stepping motor, into a linear motion, and transfer it to carriage 10.

The proximal end of head arm 12 is fixed to supporting block 14 of carriage 10 by means of leaf springs 24. As springs 24 are deformed, arm 12 can move between an unloaded position, in which it is inclined at a predetermined angle to carriage 10, as shown in FIG. 1, and a loaded position in which the arm abuts against stoppers 26 to be kept parallel to the carriage, as shown in FIG. 2. Coil spring 28 is arranged between carriage 10 and head arm 12, whereby the arm is urged toward its loaded position. Rectangular gimbal spring 30 is fixed on the lower surface of the distal end portion of arm 12. Further, magnetic head 32 is fixed in the center of spring 30, so as to face magnetic head 18. Since magnetic head 32 is disposed on the upper side (side 1, S1) of floppy disk 50, magnetic head 32 is hereinafter referred to as S1-head. By the action of spring 30, head 32 can pivot around the x- and y-axes.

Figure 3:
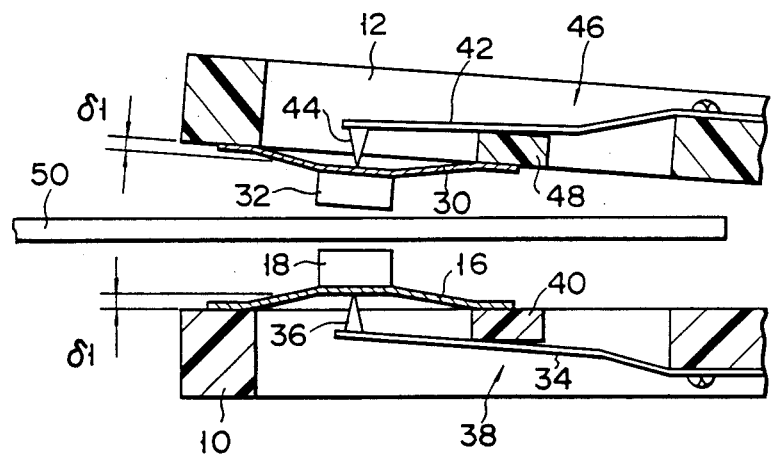

As shown in FIGS. 1 and 3, an opening is formed in that portion of carriage 10 facing gimbal spring 16, so that only the peripheral edge portion of spring 16 is fixed to the carriage. Leaf spring 34 extends in the longitudinal direction of carriage 10. It has a proximal end portion screwed to the central portion of the lower surface of carriage 10, and a free end portion facing the lower surface of gimbal spring 16. Pivot pin 36 is fixed to the free end of leaf spring 34. The tip end of pin 36, which is situated at the back of magnetic head 18, abuts against a central portion of gimbal spring 16. Consequently, spring 16 and head 18 are urged upward or toward magnetic head 32, by leaf spring 34. Thus, spring 34 and pivot pin 36 constitute load applying means 38 of the present invention, which urges spring 16 and head 18, thereby applying a predetermined load to the head.

Moreover, carriage 10 includes stopper 40 which can engage the intermediate portion of leaf spring 34, that is, the region between the proximal and free ends thereof. Stopper 40 constitutes regulating means of the invention, which regulates the deformation of spring 34, and hence, protrusion of gimbal spring 16 and head 18 toward head arm 12 by engaging spring 34.

Only the peripheral edge portion of gimbal spring 30 is fixed to the head arm as in the carriage 10. Also, spring 30 and magnetic head 32 are urged toward head 18 by load applying means 46, which includes leaf spring 42 fixed to arm 12, and pivot pin 44 fixed to the free end of spring 42. The displacement of gimbal spring 30 and head 32 toward carriage 10 is regulated by stopper 48, which is attached to head arm 12.

The operation of the supporting device, constructed in this manner, will now be described.

When the supporting device is in its unloaded state, that is, when head arm 12 is moved to its unloaded position by a release mechanism (not shown), as shown in FIG. 3, magnetic heads 18 and 32 are separated from floppy disk 50 situated between the heads for use as a recording medium. In this state, disk 50 can be inserted into or ejected through a space between heads 18 and 32.

In the unloaded state, leaf spring 34 abuts against stopper 40 so that it is restrained from moving toward head arm 12. Gimbal spring 16 and magnetic head 18 are pressed by pivot pin 36, thereby shifting their position toward disk 50 by distance $\delta 1$ (0.2 to 0.5 mm). Since leaf spring 34 abuts against stopper 40, gimbal spring 16 and head 18 are prevented from being displaced beyond distance $\delta 1$. Likewise, leaf spring 42 on the side of head arm 12 abuts against stopper 48 so that gimbal spring 30 and magnetic head 32 are displaced toward disk 50 by distance $\delta 1$.

Figure 4:
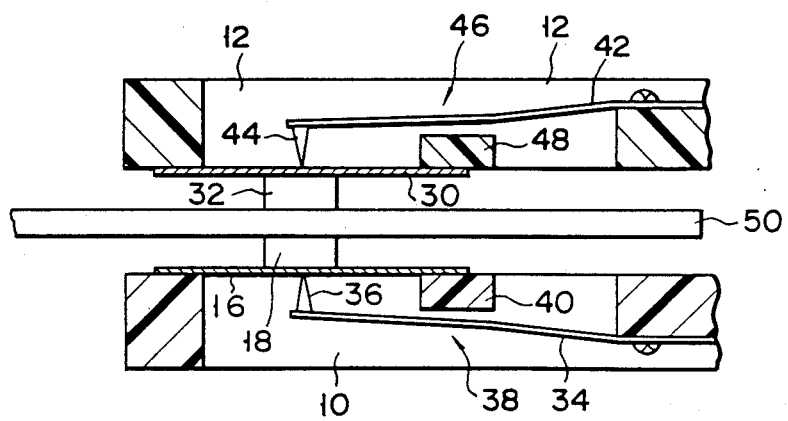

In read/write operation, head arm 12, which is pulled toward carriage 10 by coil spring 28, pivots until it abuts against stoppers 26, and is then held in its loaded position, as shown in FIGS. 2 and 4. As arm 12 approaches the loaded position, magnetic heads 18 and 32 come into contact with disk 50. As a result, the urging force of spring 28 starts to act on heads 18 and 32 so that leaf springs 34 and 42 are deformed in a direction away from disk 50, respectively. When head arm 12 abuts against stoppers 26, larger urging force of spring 28 ceases to act on heads 18 and 32. While arm 12 moves from the unloaded position to the loaded position, heads 18 and 32, gimbal springs 16 and 30, and leaf springs 34 and 42 are moved toward a direction away from disk 50 relative to the carriage 10 and arm 12 by distance $\delta 1$ each. When the supporting device is in its loaded state, therefore, distal end of each leaf spring 34 or 42 is moved by distance $\delta 1$ from its unloaded position as shown in FIG. 3 relative to carriage 10 or arm 12, and gimbal springs 16 and 30 are practically undeformed or kept parallel to disk 50. Since leaf spring 34 is separated from stopper 40, its urging force produced by its bending action, is concentrated as a head load on one spot on head 18 through pivot pin 36. Likewise, the urging force of leaf spring 42 is applied as another head load to head 32 through pivot pin 44. Heads 18 and 32 are kept in operative contact with disk 50 under the head loads are applied.

Figure 5:
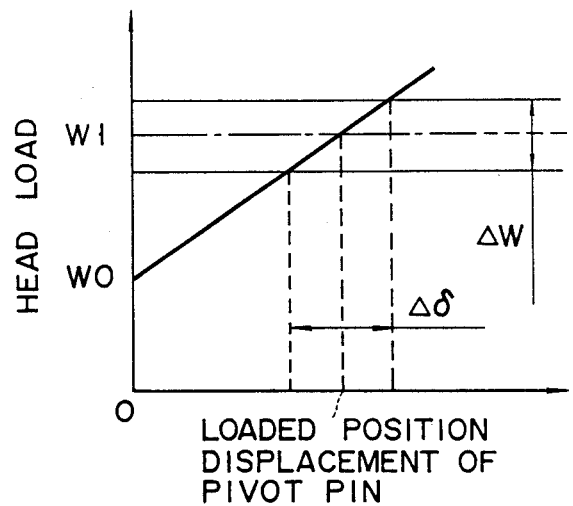

FIG. 5 shows the relationship between the displacement of each pivot pin or the distal and of each leaf spring and the change of head load. In FIG. 5, w0 indicates the head load at the moment when the leaf spring leaves its corresponding stopper, while w1 represents the head load obtained when the head arm reaches its loaded position. As seen from FIG. 5, the head load increases in proportion to the displacement of the pivot pin.

As disk 50 is rotated with magnetic heads 18 and 32 pressed against it for maintaining both heads 18 and 32 in operative contact therewith, under head load w1, the heads read or write information on the disk. During such a read/write operation, since flexible disk 50 has a tendency to deviate from its nominal plane, the heads can pivot freely around the x- and y-axes by gimbal action of gimbal springs 16 and 30 supported by their corresponding pivot pins, and can move by distance δ shown in FIG. 5 in a direction normal to the nominal plane of disk 50 because of flexibility of the leaf springs and the gimbal springs, thereby compensating for any irregularities in disk 50. Therefore, change of the head load, which acts on corresponding magnetic head 18 or 22 in its loaded state, is set within range w.

According to the magnetic head supporting device constructed in this manner, the deformation of the leaf springs of the load applying means, used to apply load to the magnetic head, is restricted by the stoppers. Therefore, the displacement of the gimbal springs and the magnetic heads toward the recording medium in the unloaded state can be reduced. Thus, even if the stroke of the head arm from the loaded position to the unloaded position is relatively short, the magnetic heads can be separated securely from the recording medium. Also, in the unloaded state, the displacement of leaf springs 34 and 42 is kept small by corresponding stoppers 40 and 48, and thus the urging force generated by leaf springs 34 and 42 toward corresponding gimbal springs 16 and 30 is also small that the rigidity and spring force of the gimbal springs can be reduced. If the gimbal springs have a smaller spring force and lower rigidity, however, the degree of freedom of their deformation increases in proportion. Moreover, the head load can be set accurately, without being influenced by the urging force of the gimbal springs.

In the loaded state, furthermore, the gimbal springs are undeformed or kept parallel to the recording medium. The degree of freedom of the movement of the gimbal springs is higher in the undeformed state than in the deformed state. Since the gimbal springs supported by the pivot pins incline about x- and y-axes parallel to the nominal plane of disk 50, moreover, the degree of freedom of their movement increases further. Accordingly, the magnetic heads, fixed to their corresponding gimbal springs, can roll and pitch more freely during the read/write operation, thereby fully absorbing irregular behavior of the recording medium to deviate from its nominal plane and errors in manufacture and assembly of the supporting device. Thus, the tracking performance for magnetic heads' accurately tracing a certain data track on disk 50, and contacting capability of the magnetic heads with the recording medium as well as the reliability of the read/write operation are improved.

In the loaded position, head arm 12 is in engagement with stoppers 26 so that the urging force of coil spring 28, which is used to hold the head arm in its loaded position, has no more influence on the head load. Thus, the head arm can be held securely in the loaded position by increasing the spring force of the coil spring. If the supporting device vibrates or is subjected to an impact, therefore, irregular movement of the head arm can be inhibited, and thus the displacement of the magnetic heads can be minimized. In the arrangement described above, moreover, if the supporting device undergoes such a vibration or impact, the leaf springs of the load applying means are influenced not by the mass of the head arm, but only by the mass of the magnetic heads which is much lighter than that of the head arm. Accordingly, the displacement of the leaf springs, and hence, of the magnetic heads, can be reduced when the supporting device vibrates or is subjected to an impact. Thus, the supporting device is improved in reliability, with respect to vibration and impact.

Figure 6:
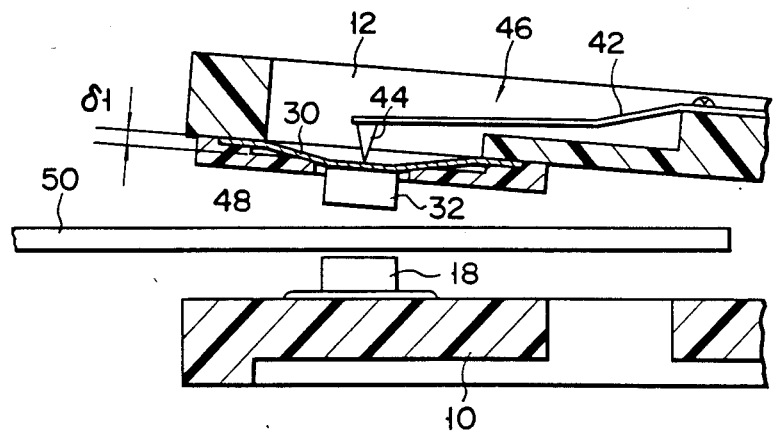
Figure 7:
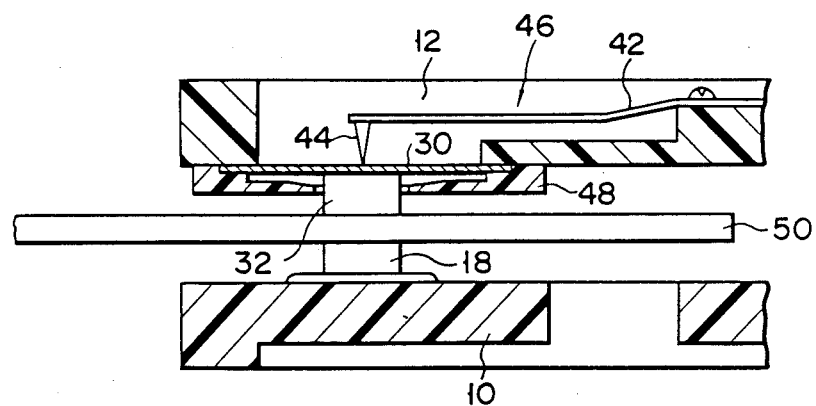

FIGS. 6 and 7 show a second embodiment of the present invention.

According to this embodiment, magnetic head 18 is fixed directly to carriage 10 without the use of a gimbal spring. Stopper 48, which serves as means for restricting the displacement of magnetic head 32 toward disk 50, is located on the disk side of gimbal spring 30 so as to be able to engage spring 30. More specifically, stopper 48 is fixed to the lower surface of head arm 12 and extends close to head 32 from the peripheral edge of spring 30 so as to cover the gimbal spring. If arm 12 is situated in its unloaded position, as shown in FIG. 6, spring 30 abuts against stopper 48 when it is moved toward disk 50 by distance δ1 (0.2 to 0.5 mm). If arm 12 is situated in its loaded position, as shown in FIG. 7, spring 30 is restored to an undeformed state such that it extends parallel to disk 50. At the same time, a predetermined head load is applied to magnetic head 32 by load applying means 46. The same head load is applied also to magnetic head 18 through disk 50. Magnetic head 32 forcers disk 50 against magnetic head 18 by the head load applied, and thus both magnetic heads 18 and 32 are maintained in operative contact with disk 50.

With respect to other components or mechanisms, the second embodiment is constructed substantially in the same manner as the first embodiment. In FIGS. 6 and 7, therefore, like reference numerals refer to the same parts in the first embodiment.

Constructed in the aforesaid manner, the second embodiment can provide the same functions and effects of the first embodiment. Since stopper 48 abuts directly against gimbal spring 30, magnetic head 32 can be prevented securely from being displaced inclined unexpectedly. Especially, head 32 is prevented from projecting when it leaves disk 50.

Figure 8:
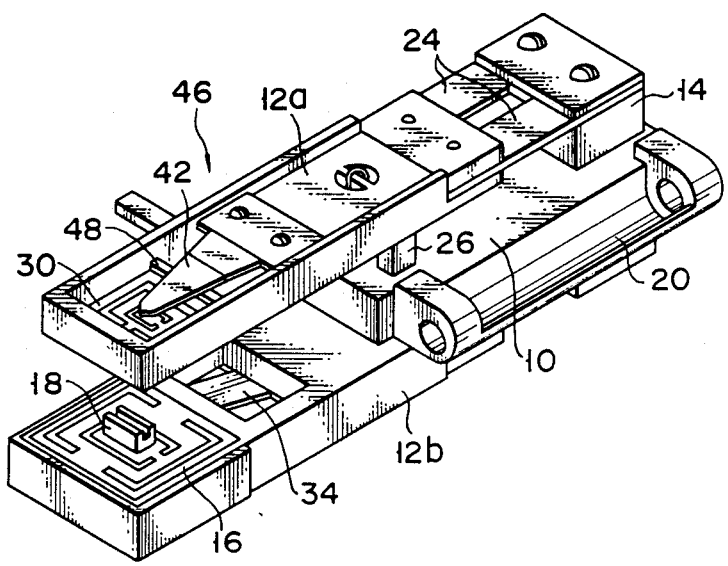
FIG. 8 is a perspective view of a magnetic head supporting device according to a third embodiment of the invention.

FIG. 8 shows a third embodiment of the present invention.

According to this embodiment, carriage 10 is formed independently of the head arms. More specifically, the supporting device comprises three independent components, carriage 10 and first and second head arms 12a and 12b attached thereto. Arms 12a and 12b, which are mounted on carriage 10 by means of leaf springs 24, extend parallel to each other. They are movable between loaded and unloaded positions. A magnetic head is fixed to the distal end portion of first arm 12a by means of gimbal spring 30, while magnetic head 18 is fixed to the distal end portion of second arm 12b by means of gimbal spring 16. With respect to other components, the third embodiment is constructed substantially in the same manner as the first embodiment. In FIG. 8, therefore, like reference numerals are used to designate like portions as shown in FIGS. 1 to 4.

Constructed in this manner, the third embodiment can also provide the same functions and effects of the first embodiment.

It is to be understood that the present invention is not limited to the embodiments described above, and that various changes and modifications may be effected therein by one skilled in the art without departing from the scope or spirit of the invention. For example, the urging member for urging each magnetic head toward the recording medium is not limited to a leaf spring. Alternatively, a coil spring may be used for this purpose.

What is claimed is:

1. A magnetic head supporting device for keeping first and second magnetic heads in contact with both sides of a flexible planar recording medium to record information thereon or to read information therefrom, comprising:

a carriage which is radially movable along a plane of the recording medium;

first and second head supporting arms supporting the first and second heads, respectively, such that the heads oppose each other with the recording medium adapted to be interposed therebetween, each of the first and second head supporting arms being supported by the carriage at one end thereof and having opposite ends on which said heads are located constituting free end portions, at least one of the first and the second head support arms being pivotable toward and away from a planer area in which the recording medium is adapted to be disposed;

arm loading means for forcing at least one of the first and the second head supporting arms in a direction to be closer to each other; and at least one of the first and the second head supporting arms including:

(a) an opening in the free end portion thereof;

(b) a substantially rectangular gimbal spring having a peripheral edge portion fixed to a surface of said at least one head supporting arm which faces the other head supporting arm, and having a central portion, one side of which supports the corresponding head, so that the head is pivotable about axes parallel to the plane of the recording medium, said gimbal spring covering said opening and being in a substantially undeformed condition in a loaded state wherein both heads remain in contact with the recording medium;

(c) head load applying means, abutting against the gimbal spring at the other side of the central portion, for biasing the head toward the recording medium by being deflected by the arm loading means in the load state; and (d) head protrusion regulating means arranged between the gimbal spring and the head load applying means, for directly abutting against the head load applying means in a way to limit the biasing action of the head load applying means when at least one of the first and second head supporting arms is pivoted away from the plane of the recording medium in an unloaded state, thereby preventing said one head from being excessively protruded toward the other head in said unloaded state.

2. A magnetic head supporting device as in claim 1 wherein said first head supporting arm is coupled to said carriage as an extension thereof.

3. A magnetic head supporting device as in claim 1 wherein said first and second head supporting means are both separate from but coupled to said carriage.

4. A magnetic head supporting device as in claim 1 wherein said head load applying means includes a surface ending in a point which abuts said other side of said gimbal spring.

5. A magnetic head supporting device according to claim 1, which further comprises:

means for limiting the pivot motion of the, at least one, head supporting arm toward the other head supporting arm.

6. A magnetic head supporting device for keeping first and second magnetic heads in contact with both sides of a flexible planar recording medium to record information thereon or to read information therefrom, comprising:

a carriage which is radially movable along a plane of the recording medium;

first and second head supporting arms supporting the first and second heads, respectively, such that the heads oppose each other with the recording medium adapted to be interposed therebetween, each of the first and second head supporting arms being supported by the carriage at one end thereof and having opposite ends on which the heads are located, at least one of the first and the second head supporting arms being pivotable toward and away from a planer area in which the recording medium is adapted to be disposed;

arm loading means for forcing at least one of the first and the second head supporting arms in a direction to be closer to each other; and at least one of the first and the second head supporting arms including:

(a) an opening in the free end portion thereof;

(b) a substantially rectangular gimbal spring having a peripheral edge portion fixed to a surface of said at least one head supporting arm which faces the other head supporting arm, and having a central portion, one side of which supports the corresponding head, so that the head is pivotable about axes parallel to the plane of the recording medium, said gimbal spring covering said opening and being in a substantially undeformed condition in a loaded state wherein both heads remain in contact with the recording medium;

(c) an urging member, abutting against the gimbal spring at the other side of the central portion, for biasing the head toward the recording medium by being deflected by the arm loading means in the loaded state; and (d) a stopper attached to the head supporting arm and arranged between the gimbal spring and the urging member, for directly abutting against the urging member to limit a deformation of the urging member toward the recording medium when at least one of the first and second head supporting arms is pivoted away from the plane of the recording medium in an unloaded state, thereby preventing the head from being excessively protruded toward the other head in said unloaded state.

* * * * *